United States Patent [19]

Wakabayashi et al.

[11] Patent Number: 5,570,158
[45] Date of Patent: Oct. 29, 1996

[54] CAMERA HAVING VISUAL LINE DETECTING DEVICE AND METHOD OF PHOTOGRAPHY PERFORMED THEREBY

[75] Inventors: Hiroshi Wakabayashi, Yokohama; Yuji Katano; Minoru Kato, both of Kawasaki, all of Japan

[73] Assignee: Nikon Corporation, Tokyo, Japan

[21] Appl. No.: 371,485

[22] Filed: Jan. 11, 1995

Related U.S. Application Data

[63] Continuation of Ser. No. 220,452, Mar. 30, 1994, abandoned, which is a continuation of Ser. No. 5,829, Jan. 19, 1993.

[30] Foreign Application Priority Data

Jan. 20, 1992  [JP]  Japan ..................................... 4-027510

[51] Int. Cl.$^6$ ........................................................ G03B 7/00
[52] U.S. Cl. ............................ 396/51; 396/296; 396/263
[58] Field of Search ............................... 354/410, 62, 219, 354/400, 402

[56] References Cited

U.S. PATENT DOCUMENTS

| | | |
|---|---|---|
| 4,574,314 | 3/1986 | Weinblatt ................................. 354/400 |
| 4,836,670 | 6/1989 | Hutchinson . |
| 4,950,069 | 8/1990 | Hutchinson . |
| 5,036,347 | 7/1991 | Tsunekawa et al. . |
| 5,225,862 | 7/1993 | Nagano et al. ........................... 354/400 |
| 5,335,035 | 8/1994 | Maeda ...................................... 354/219 |

FOREIGN PATENT DOCUMENTS 4-236935  8/1992  Japan .

*Primary Examiner*—Russell E. Adams
*Attorney, Agent, or Firm*—Oliff & Berridge

[57] ABSTRACT

This camera includes a viewfinder and a device (4) for detecting the visual line of a photographer looking through the viewfinder, an operation member (1), (8) such as a release button which is operated by the photographer to take a photograph, a means (2) for inputting calibration information, and a means for performing photography (5), (6), (7). The calibration information input means (2) operates in response to the operation of the operation member (1), (8), and inputs and stores calibration information when the photographer fixates on a target mark (3, b) visible within the viewfinder, based upon the visual line detected at that time by the visual line detection means (4). The object intended by the photographer to be photographed is detected and photographs it, based upon the visual line detected by the visual line detection means (4) and the stored calibration information.

17 Claims, 3 Drawing Sheets

CAMERA HAVING VISUAL LINE DETECTING DEVICE AND METHOD OF PHOTOGRAPHY PERFORMED THEREBY

This is a Continuation of application Ser. No. 08/220,452 filed Mar. 30, 1994, now abandoned, which in turn is a Rule 62 Continuation of Ser. No. 08/005,829, filed Jan. 19, 1993.

CROSS REFERENCE TO RELATED APPLICATION

Reference is made to the following commonly assigned copending application:

(1) Ser. No. 07/801,042 entitled CAMERA CONTROL DEVICE, filed Mar. 12, 1991 in the name of Daiki Tsukahara and Hideya Inoue (corresponding foreign/PCT applications—Nos. 2-409798 and 2-409981, Japan).

BACKGROUND OF THE INVENTION

1. Field of the Invention

The present invention relates to a camera which is equipped with a device which detects the visual line of the photographer and a method of photography using this device.

2. Related Background Art

A camera has been previously proposed, for example in U.S. Pat. Nos. 4,836,670, 4,950,069, and 5,036,347, which is equipped with such a type of device for detecting the visual line of a person using the camera. This type of visual line detection device, for example, is constructed so as to shine infra-red radiation onto the eyeball of a photographer looking into the viewfinder of the camera from an infra-red illumination device provided within the camera, and so as to detect which part of the region visible within the viewfinder is currently being focused upon by the photographer based upon radiation reflected from the eyeball of the photographer. The device is termed a visual line detection device which in this manner, by sensing radiation reflected from the eyeball of the photographer, detects which region of the field visible within the viewfinder is being gazed at and focused upon by the photographer, i.e. at which region the photographer is directing his or her attention.

If the region of the photographic field which is being focused upon (fixated upon) by the photographer is determined by such a visual line detection device, afterwards focusing of the camera on an object located in this region of the photographic field can be performed by moving a lens of the camera by using a typical per se known type of autofocusing device, and also the most suitable exposure can be determined and set by the use of a per se known type of automatic exposure determination and setting device. Thus even an inexperienced photographer is enable to perform photography while minimizing mistakes.

From the following viewpoints, it is necessary to correct the visual line as determined by the use of such a type of visual line detection device.

1) The position at which the photographer is actually directing his or her attention (fixating), and the point of attention of the photographer as determined by such an above type of visual line detection device, do not necessarily always agree, and moreover the difference between these two positions varies between different photographers, according to the personal characteristics of their eyeballs, etc.

2) The curvature of the eyeball varies according to the individual photographer.

For these reasons, with the cameras disclosed in the above identified U.S. Patents, before normal photographic operation a different operation is previously performed by hand, and information (hereinafter termed calibration information) which is necessary for the above described correction is input into the camera and is stored therein.

A camera equipped with a visual line detection device according to the prior art as described above in which such a correction process is performed is subject to the following deficiency.

If a second person (Mr.B) wishes to use a camera into which calibration information suitable for a first person (Mr.A) has already being input and stored, then, before performing photography, Mr.B must perform an operation for inputting calibration information appropriate to his own eyeball which differs from normal photographic operation; and this makes the camera difficult to use. Further, if erroneously this new calibration information is not obtained, and instead photography is performed by Mr. B while the old calibration information appropriate to Mr.A is still stored in the camera, then the correction of the visual line of the photographer will be performed using the old incorrect calibration information, and it is likely that an incorrect visual line will be determined.

A further problem can arise in the case of a photographer who does not have a strongly dominant eye. Most people always use a dominant or favorite eye for looking through a restricted aperture such as a telescope, a microscope, or a camera viewfinder; but a minority of people freely use either eye for such purposes. Since the left and right eyeballs even of the same person typically may differ substantially in their curvature characteristics (astigmatism etc.), this can present a problem with regard to inconsistency of calibration information, similar to the problem described above with regard to the camera being used by two different camera users.

SUMMARY OF THE INVENTION

The objective of the present invention is to provide a camera equipped with a visual line detection device, in which the operation of inputting the calibration information is made easier, more automatic, and more streamlined.

According to an apparatus aspect of the present invention, in order to attain this objective and others, there is proposed a camera, comprising: a viewfinder; a means for detecting the visual line of a photographer looking through the viewfinder; an operation member adapted for being operated by the photographer for photography; a means for inputting calibration information, which operates in response to the operation of the operation member, and which, when the photographer fixates on a target mark visible within the viewfinder, inputs and stores calibration information based upon the visual line detected by the visual line detection means; and: a means for performing photography which, based upon the visual line detected by the visual line detection means and the stored calibration information, detects the object intended by the photographer to be photographed and performs photography thereof.

It is appropriate for the operation member to be a release button. The means for inputting calibration information may desirably comprise a light emitting element which, linked to the operation of the release button, is illuminated to display the mark in the viewfinder, and a storing means which, when the light emitting element is thus illuminated, stores calibration information based upon the visual line of the photographer as detected by the visual line detection means.

The means for inputting calibration information may desirably comprise: a means for detecting eyeball application which detects whether the photographer is applying an eyeball to the viewfinder; a light emitting element which, linked to the detection of eyeball application by the means therefor, is illuminated to display the mark in the viewfinder; and a storing means which, when the light emitting element is thus illuminated, stores calibration information based upon the visual line of the photographer as detected by the visual line detection means.

The means for performing photography may desirably be provided with a mode in which it does not make use of visual line detection, and in which mode, when the visual line detection process does not produce any result, the means for performing photography detects the object intended by the photographer to be photographed and performs photography thereof. In such a case, this means for performing photography may be so constructed as to perform photography in the mode in which it does not make use of visual line detection, when it has not been possible to store the calibration information within a predetermined time period; or it may be so constructed as to perform photography in the mode in which it does not make use of visual line detection, when, after the calibration information has been stored within a predetermined time period, it is detected that the photographer is not applying an eyeball to the viewfinder.

The camera of the present invention, which inputs calibration information, and which detects the object intended by the photographer to be photographed based upon a visual line detected by a visual line detection means and the stored calibration information and performs photography thereof, may desirably be further provided with a means for preventing shutter release until the calibration information has been stored.

On the other hand, according to a method aspect of the present invention, there is proposed, in order to attain the above described objective and others, a method of photography for a camera provided with a viewfinder and a means for detecting the visual line of a photographer looking through the viewfinder, in which the following processes are executed in the specified order: a display process, in which a target mark is displayed at a fixed position within the viewfinder in response to the operation of an operation member which is adapted for being operated by the photographer for photography; a storage process, in which calibration information is stored based upon the visual line detected by the visual line detection means when the photographer fixates on the displayed target mark; a visual line detection process, in which the visual line detection means detects the visual line of the photographer; and a photography process, in which, based upon the visual line detected by the visual line detection means and the stored calibration information, the object intended by the photographer to be photographed is detected, and photography thereof is performed.

DETAILED DESCRIPTION OF THE PREFERRED EMBODIMENT

Figure 2:
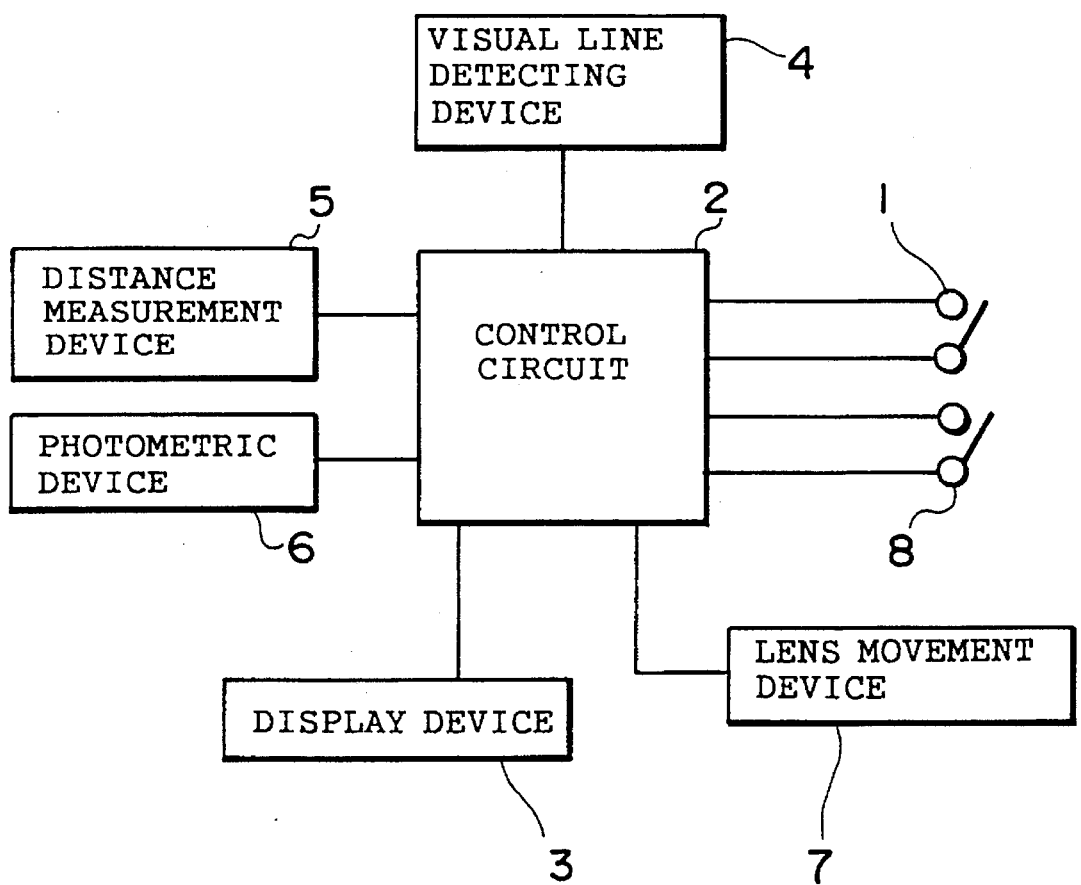
FIG. 2 is a block diagram of a control system which is incorporated in the preferred embodiment of the present invention.
Figure 3:
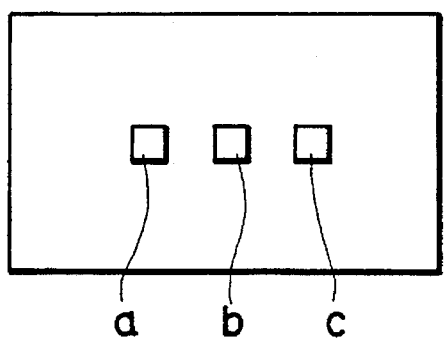
FIG. 3 is a figure showing three light emitting elements a, b, and c which are disposed in a viewfinder of the preferred embodiment of the present invention.

With reference to FIG. 2, the reference numeral 1 denotes a first stroke switch which is turned on by first stroke operation of a release button (not itself shown) incorporated in the preferred embodiment of the camera of the present invention, while 8 is a second stroke switch which is turned on by second stroke operation of the release button; and these first and second stroke switches 1 and 8 are connected to a control circuit 2 which comprises a CPU and various associated circuitry. The reference numeral 3 denotes a display device which includes a set of three visible light emitting diodes a, b, and c which are provided, as shown in FIG. 3, in the field of view of a viewfinder (not particularly shown) of this camera. Any one of these three light emitting diodes a, b, and c can be selectively illuminated under control of the control circuit 2, as will be described hereinafter.

The reference numeral 4 denotes a visual line detection device which is per se disclosed in the above identified U.S. Patents, and which is so constructed that, when a power switch not shown in the figures is turned on, infra-red radiation is emitted from an infra-red emitting diode for use for visual line detection not shown in the figures, and the visual line of the photographer is detected, based upon the output from a photoreceptive element for use for visual line detection which receives reflected radiation reflected from the eyeball of the photographer. Further, when the first stroke switch 1 is turned on by first stroke operation of the release button or the photographer applys his or her eyeball to the viewfinder, one of the visible light emitting diodes a, b, and c of the display device 3 shown in FIG. 3 is caused to emit light, and based upon the visual line detected at this time calibration information specific to this photographer is input and recorded.

A distance measurement device 5 measures the distance to the object which is being photographed in a manner which is per se well known, and a photometric device 6 measures the object field luminance distribution in a manner which also is per se well known. The reference numeral 7 denotes a lens movement device, and based upon the result of measurement by the distance measurement device 5 a focusing lens not shown in the figures is moved to an appropriate focus position.

Figure 1A:
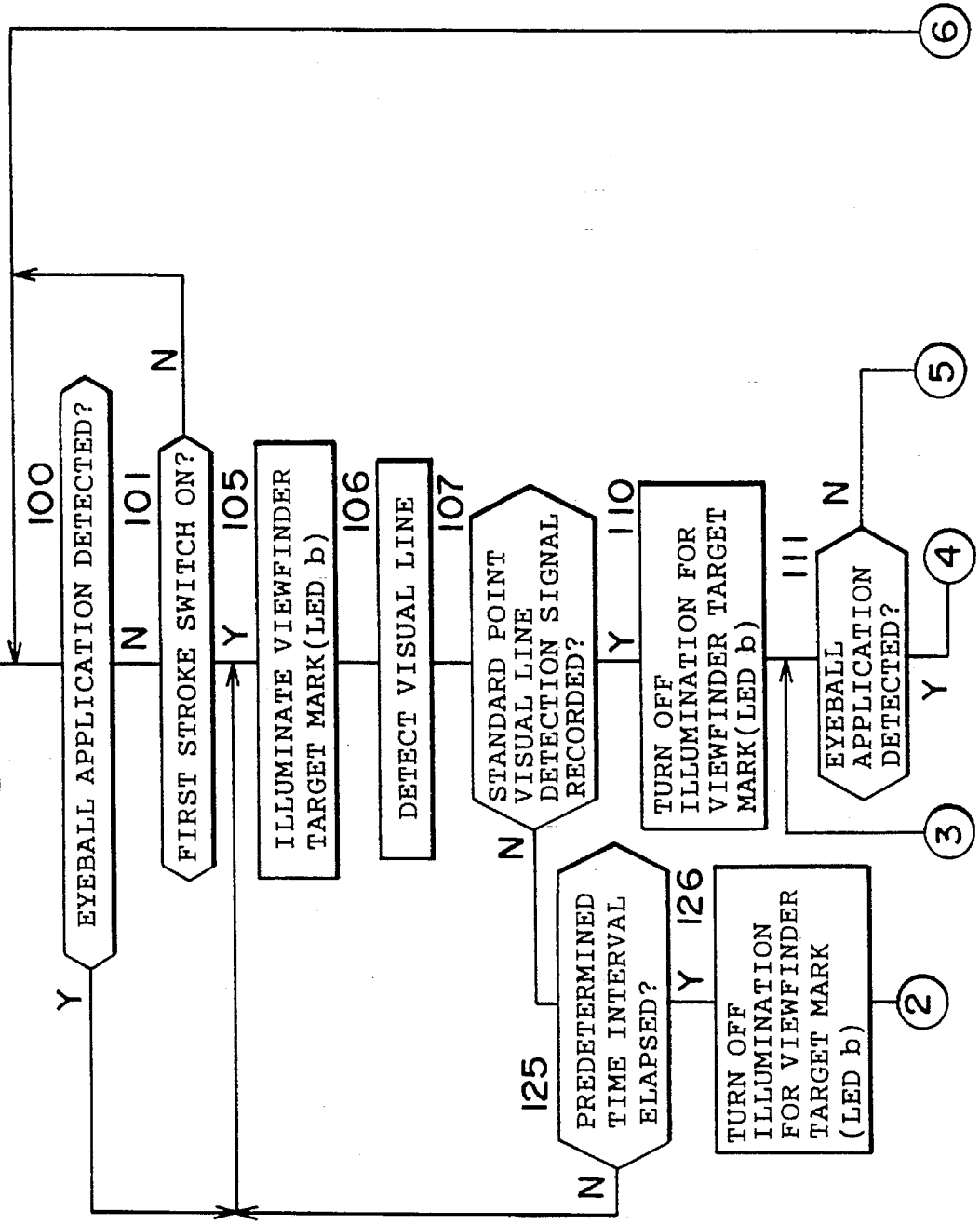
FIG. 1A is a flow chart showing the steps of the processes of visual line detection and taking a photograph which, in the preferred embodiment of the camera having visual line detecting device of the present invention, are executed by a control circuit (CPU) shown in FIG. 2.
Figure 1B:
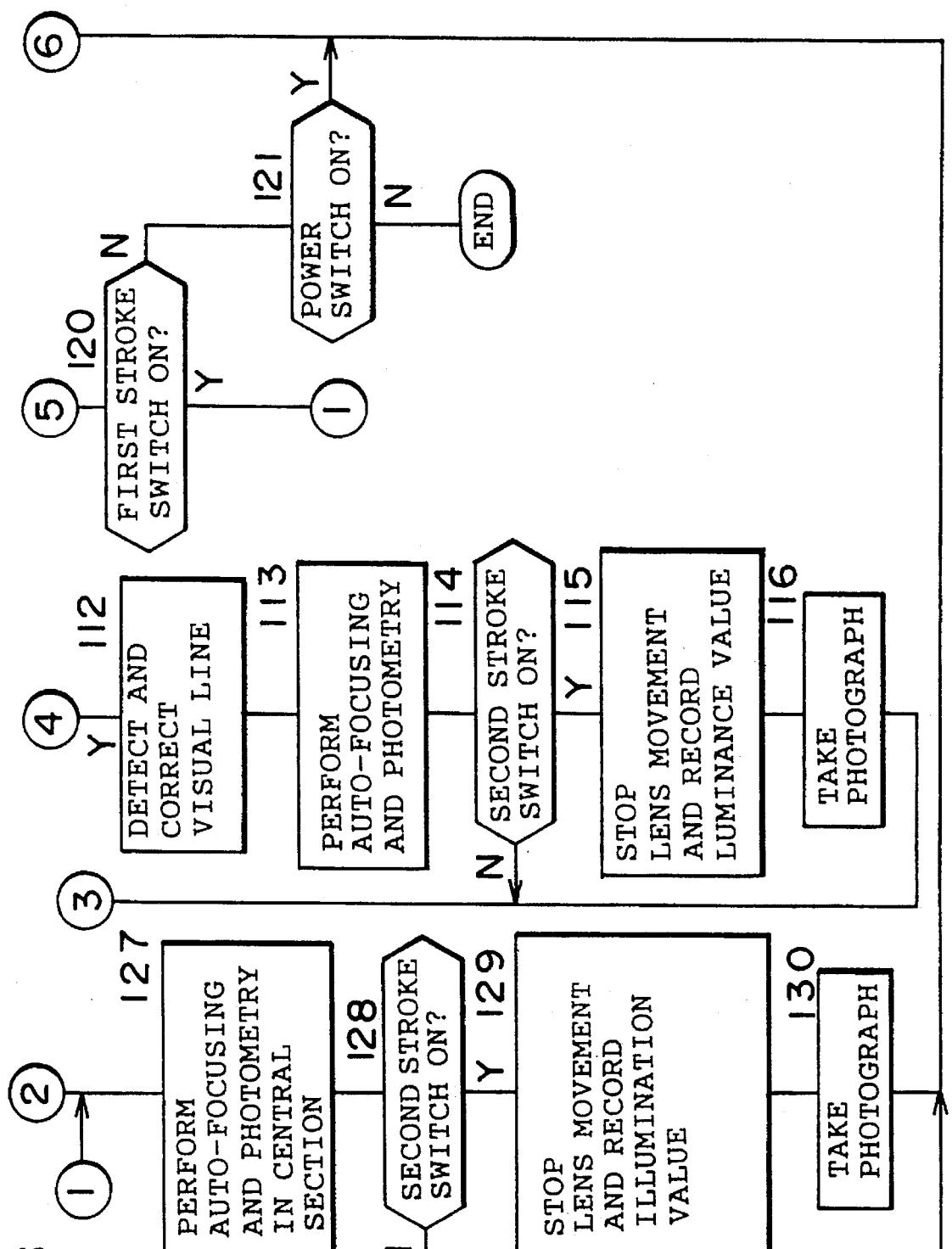
FIG. 1B is a continuation of the flowchart shown in FIG. 1A.

FIG. 1 is a flow chart for a program which is performed by the CPU (not particularly shown) incorporated in the control circuit 2 shown in FIG. 2, and the operation of the preferred embodiment of the camera of the present invention will now be explained with reference to this flow chart.

When the power switch not shown in the figures is turned on and the operation shown in the flow chart of FIG. 1 is started, first in the decision step 100 a decision is made as to whether or not the photographer is applying his or her eyeball to the viewfinder. Determination of whether or not eyeball application is taking place is performed as will now be explained. When the power switch is turned on, the infra-red diode for visual line detection which is provided in the visual line detection device 4 is turned on to emit infra-red radiation. Because if in fact a photographer is looking through the viewfinder the infra-red radiation reflected from his or her eyeball will be detected by the photoreceptive element for visual line detection, therefore it is possible to determine whether or not eyeball application is taking place according to the output of the photoreceptive element for visual line detection.

If in the decision step 100 it has been decided that viewfinder eyeball application is taking place, then the flow of control passes next to the decision step 101, in which a decision is made as to whether or not the first stroke switch 1 is currently ON or not. If the result of this decision is NO, then the flow of control returns to the decision step 100 again, while, if the result of this decision is YES, then the flow of control passes next to the step 105, in which one of the visible light emitting diodes a, b, and c, for example the central light emitting diode b, is illuminated so as to present a target mark at a standard point towards the center of the viewfinder for input of calibration information. Thus, the visual line of the photographer is forcibly oriented towards the target mark constituted by the central light emitting diode b, and next in the step 106 the visual line of the photographer while he or she is fixing his or her gaze on (fixating upon) the central light emitting diode b is detected by the visual line detecting device 4, and is recorded as a standard point reference signal. Accordingly, by the camera considering this reference signal recorded when the photographer is fixing his or her gaze at this standard point as a standard point visual line detection signal, this recorded reference signal can be used as calibration information for visual line correction.

Next, in the decision step 107, a decision is made as to whether or not this standard point visual line detection signal has been recorded or not; and, if the standard point signal has been so recorded, then, since the target mark display provided by the central light emitting diode b is no longer required, the flow of control passes next to the step 110, in which the central light emitting diode b is turned off. Subsequently, in the decision step 111, a decision is made in the same manner as in the previous decision step 100 as to whether or not the photographer is applying his or her eyeball to the viewfinder, and if it is decided that at this time instant eyeball application is still taking place then the flow of control proceeds next to the step 112, in which, along with detecting the actual visual line of the photographer in the photographic field by the visual line detecting device 4, the result of this visual line detection is corrected according to the calibration information which has been recorded as described above. It would also be acceptable, as an alternative, directly to calculate the visual line of the photographer by using the output from the photoreceptive element in the visual line detecting device 4 and the calibration information.

Next the flow of control proceeds to the step 113, in which, along with detecting by the distance measurement device 5 the distance to the part of the object to be photographed which lies in the focal point detection region corresponding to the thus detected and corrected visual line, the luminance is measured by the photometric device 6, and the photographic lens is moved by the lens movement device 7 to an appropriate focus position. Subsequently, in the decision step 114, a decision is made as to whether or not the second stroke switch 8 is currently ON or not. If the result of this decision is NO, then the flow of control returns to the decision step 111 again, while, if the result of this decision is YES, then the flow of control passes next to the step 115, in which, along with stopping the movement of the photographic lens after it has been moved to its appropriate focusing position, the measured value of luminance is recorded; and next the flow of control passes to the step 116, in which the photograph is taken.

After the photograph has been taken, the flow of control returns back to the decision step 111, and again the test for eyeball application is performed. When at this time point the photographer is found to have removed his or her eyeball from the viewfinder, then the result of this decision comes to be NO, and the flow of control proceeds next to the decision step 120, in which a decision is made as to whether or not the first stroke switch 1 is ON. If the first stroke switch 1 is found to be OFF, then the flow of control proceeds to the decision step 121, in which a decision is made as to whether or not the power switch is ON. If the power switch is ON, the flow of control returns back to the decision step 100 again, while if the power switch is OFF the operation of the control circuit 2 terminates, since this episode of photography is concluded.

For example, in a case like the one of photographing a subject from the rear of a crowd, because it is difficult to take such a photograph while looking through the viewfinder, after the calibration information has been recorded and this has been checked in the decision step 107, in the subsequent decision step 111 a decision is again reached as to whether eyeball application is occurring. If a decision is reached to the effect that eyeball application is not occurring then the flow of control proceeds next to the decision step 120, from which, if it is decided that the first stroke switch 1 is ON, then the flow of control passes next to the steps 127 through 130, in which photography is performed without the result of visual line detection being employed. That is to say, in the step 127 the distance measurement device 5 measures the distance to the subject in the central region of the photographic field and the photometric device 6 measures the luminance with respect to the central region of the photographic field, and the photographic lens is moved by the lens movement device 7 to an appropriate focus position for the subject lying in this central field region and the exposure suitable for the subject is set. Next, in the decision step 128, a decision is made as to whether or not the second stroke switch 8 is currently on or not. If the result of this decision is NO, then the flow of control returns back to the initial decision step 100 again, while, if the result of this decision is YES, then the flow of control passes next to the step 129, in which, along with stopping the movement of the photographic lens after it has been moved to its appropriate focusing position, the measured value of luminance is recorded; and next the flow of control passes to the step 130, in which the photograph is taken. After the photograph has been taken, the flow of control returns back to the initial decision step 100 again.

Even when in the step 105 the visible light emitting diode b in the central portion of the viewfinder is illuminated, recording of the result of visual line detection does not continue to be performed in the case, for example, that the photographer removed his or her eye from the viewfinder. In such a case, the flow of control passes from the decision step 107 to the decision step 125, and a decision is made as to whether or not a predetermined time interval has elapsed. Until this predetermined time interval has elapsed, the flow of control passes back to the step 105 again and loops round through the steps 105, 106, 107, and 125, and during this interval the visible light emitting diode b continues to be illuminated.

On the other hand, when in the decision step 125 the decision is made that the predetermined time interval has elapsed, then the flow of control proceeds to the step 126, in which the central light emitting diode b is turned off. After this, the flow of control proceeds to the step 127 and the subsequent steps which have already been explained, so that focusing and exposure setting are performed in relation to the subject lying in the central region of the photographic field, and, if it is decided in the decision step 128 that the second stroke switch 8 is ON, then the movement of the photographic lens after it has been moved to its appropriate focusing position is stopped, the measured value of luminance is recorded, and the photograph is taken. After the photograph has been taken, the flow of control returns back to the initial decision step 100 again.

By the operation of the program described above, before the photograph is taken, the calibration information is recorded in the following manner.

When the power switch is turned ON, the infra-red diode inside the visual line detection device is illuminated, and the visual line detection device goes into the standby operational state. When the photographer applies his or her eyeball to the viewfinder, this eyeball application is detected by the visual line detection device, and the central visible light emitting diode b is illuminated for a predetermined time period only. Even if eyeball application is not detected, if the first stroke switch 1 is turned ON, the central light emitting diode b is illuminated for this predetermined time period.

Because the attention of the photographer is forcibly directed by the illumination of the central light emitting diode b to the target mark which it constitutes, the visual line of the eye of the photographer is directed at this time to this central light emitting diode b (is fixated thereon). Therefore at this time the visual line detecting device 4 is caused to perform visual line detection in relation to this reference point, and the result thereof is stored as the calibration information. Based upon this stored calibration information relating to the standard point and on the result of visual line detection obtained when the photograph is actually to be taken, the visual line of the photographer at the time of actual photography is calculated, and the distance is obtained to the portion of the photographic field which is positioned in the region of the visual line obtained as the result of this calculation, as well as the exposure most appropriate for this portion of the photographic field being calculated.

And, along with moving the photographic lens to its proper position for focusing the camera to this distance, the exposure time for the shutter of the camera and/or the lens aperture thereof are adjusted so as to set the exposure to this most appropriate calculated value. After this the photograph is taken when the second stroke switch 8 comes to be ON according to second stroke operation of the release button.

With the above described preferred embodiment of the camera of the present invention, in the step 105 the visible light emitting diode b in the central portion of the viewfinder is illuminated in order to obtain and store the inputted calibration information. However the accuracy of visual line detection is enhanced if, as an alternative, instead of providing one visible light emitting diode in the central portion of the viewfinder, four such visible light emitting diodes are provided at the four corners of the viewfinder and are illuminated in turn, so as to provide a series of four target marks for input of four different sets of calibration information for checking against one another, as the photographer fixated upon each of these diodes as they are illuminated in turn.

Further, as another possible embodiment, there is the following possibility which is also effective. In general, after one photograph has been taken there is a possibility that a different photographer may use the camera for photography, and whenever this happens, visual line detection for the standard point, namely the input of visual line calibration information, is required to be performed. However, if only one person is using the camera, after the visual line calibration information has been inputted and stored once while taking a first photograph, it is not required to input and store such calibration information again when taking subsequent photographs. Therefore there is a benefit in constructing the camera with a mode changeover switch which can be switched over between a first mode in which the visual line calibration information is only stored the first time a photograph is taken (the single user mode), and a second mode in which the calibration information is stored each and every time a photograph is taken (the multi user mode).

Further, with the visual line detection device of the shown preferred embodiment, because the application of the eyeball of the photographer to the viewfinder can be detected by using the infra-red radiation which is also used for visual line detection, thereby it is not necessary to provide any dedicated or special equipment for such detection of photographer eyeball application, and accordingly the cost of the camera is kept low.

What is claimed is:

1. A camera, comprising:

a viewfinder;

a means for detecting a visual line of a photographer looking through said viewfinder;

an operation member that when operated causes the camera to perform photography;

a mark displaying means for automatically displaying a target mark within said viewfinder when said operation member is operated not requiring operation of any devices other than said operation member;

a means for automatically inputting and storing calibration data based upon the visual line detected by said visual line detection means when said photographer fixates on said target mark visible within said viewfinder; and a means for performing photography which, based upon the visual line detected by said visual line detection means and said stored calibration data, detects an object fixated on by said photographer to be photographed and performs photography thereof.

2. A camera according to claim 1, wherein said operation member is a release button that causes said mark displaying means to automatically display said target mark when said release button is pressed halfway down.

3. A camera according to claim 1, wherein said means for performing photography is provided with a mode in which it does not make use of visual line detection, and in which mode, when said visual line detection process does not produce any result, said means for performing photography detects the object intended by said photographer to be photographed and performs photography thereof.

4. A camera according to claim 3, wherein said means for performing photography is so constructed as to perform photography in said mode in which it does not make use of visual line detection when it has not been possible to store said calibration data within a predetermined time period.

5. A camera according to claim 1, wherein, said operation member is a release button and said means for automatically inputting and storing calibration data inputs and stores said calibration data when said release button is pressed halfway down.

6. A camera, comprising:

a viewfinder;

a means for detecting a visual line of a photographer looking through said viewfinder;

a means for displaying a target mark within said viewfinder;

a means for automatically inputting and storing calibration data based upon the visual line detected by said visual line detection means when said photographer fixates on said target mark visible within said viewfinder;

a means for performing photography which, based upon the visual line detected by said visual line detection means and said stored calibration data, detects the object intended by said photographer to be photographed and performs photography thereof; and a means for preventing shutter release until said calibration data has been stored.

7. A method of photography for a camera provided with a viewfinder and a device which detects the visual line of a photographer looking through said viewfinder, in which the following processes are executed in the specified order:

a display process, in which a target mark is displayed at a fixed position within said viewfinder in response to a photographic preparatory operation, the photographic preparatory operation not requiring the operation of any devices other than an operation member that when operated by said photographer causes said camera to perform photography;

a storage process, in which calibration data is stored based upon the visual line detected by said visual line detection device when said photographer fixates on said displayed target mark;

a visual line detection process, in which said visual line detection device detects the visual line of said photographer; and a photography process, in which, based upon said visual line detected by said visual line detection device and said stored calibration data, the object intended by said photographer to be photographed is detected, and photography thereof is performed.

8. A method according to claim 7, wherein said operation member is a release button that when pressed halfway down causes said target mark to be displayed.

9. A method of photography according to claim 6, wherein in said storage process, a visual line, which is detected by said visual line detection device after a specific time has elapsed after said target mark is displayed, is stored as said calibration data.

10. A camera, comprising:

a viewfinder;

a visual line detection device that detects the visual line of a photographer looking through said viewfinder;

an operation member that when operated causes the camera to perform photography;

a mark display device that automatically displays a target mark within said viewfinder when said operation member is operated, not requiring operation of any devices other than said operation member;

a calibration data input and storage device that inputs and stores calibration data based upon the visual line detected by said visual line detection device when said photographer fixates on said target mark visible within said viewfinder; and a photographic device which, based upon the visual line detected by said visual line detection device and said stored calibration data, detects the object intended by said photographer to be photographed and performs photography thereof.

11. A camera according to claim 10, wherein said operation member is a release button that when pressed halfway down that causes said mark display device to display said target mark.

12. A camera according to claim 10, wherein said photographic device is provided with a mode in which the photographic device does not make use of visual line detection, and in which mode, when said visual line detection process does not produce any result, said photographic device detects the object intended by said photographer to be photographed and performs photography thereof.

13. A camera according to claim 12, wherein said photographic device is so constructed as to perform photography in said mode in which the photographic device does not make use of visual line detection, when said calibration data has not been stored within a predetermined time period.

14. A camera, comprising:

a viewfinder;

a visual line detection device which detects the visual line of a photographer looking through said viewfinder;

a mark display device that displays a target mark inside said viewfinder independent of the operation of devices other than an operation member, a calibration data input and storage device that automatically inputs and stores calibration data based upon the visual line detected by said visual line detection device when said photographer fixates on a target mark visible within said viewfinder; and a photographic device that prevents the shutter from being released until said calibration data is stored, and upon completion of storage of said calibration data, detects the object intended to be photographed based upon the visual line detected by said visual line detection device and said stored calibration data in response to said operation member being operated.

15. A camera according to claim 14, wherein said operation member is a release button that when pressed halfway down causes said mark display device to display said target mark.

16. A camera according to claim 14, wherein said photographic device is provided with a mode in which the photographic device does not make use of visual line detection, and in which mode, when said visual line detection process does not produce any result, said photographic device detects the object intended by said photographer to be photographed and performs photography thereof.

17. A camera according to claim 16, wherein said photographic device is so constructed as to perform photography in said mode in which the photographic device does not make use of visual line detection, when said calibration data is not stored within a predetermined time period.

* * * * *